April 28, 1942. L. E. DEMPSEY ET AL 2,280,801
BICYCLE CONSTRUCTION
Filed Sept. 6, 1938 2 Sheets-Sheet 1
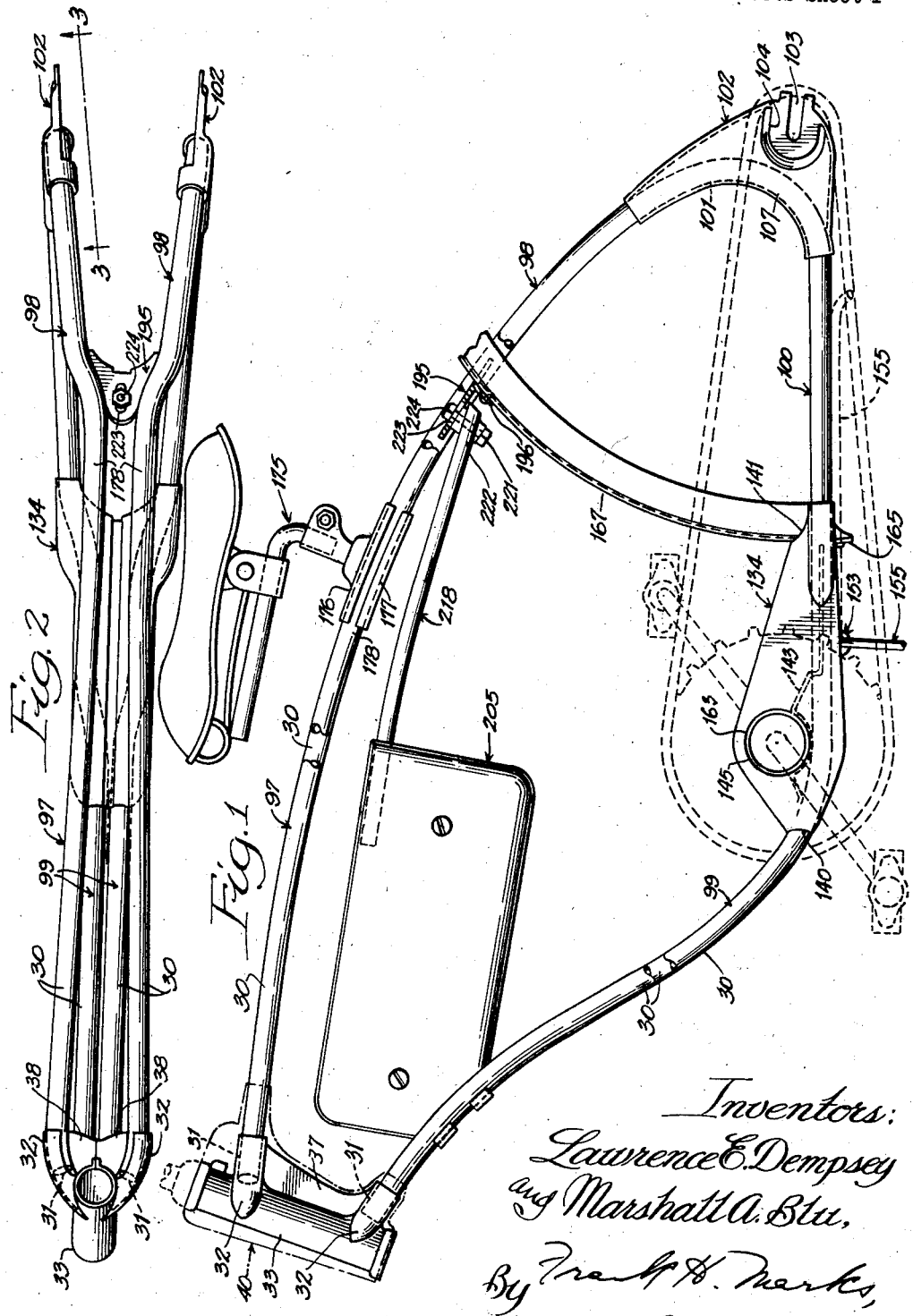
Inventors:
Lawrence E. Dempsey
and Marshall A. Blu,
By Frank H. Marks,
Attorney.

April 28, 1942.  L. E. DEMPSEY ET AL  2,280,801
BICYCLE CONSTRUCTION
Filed Sept. 6, 1938  2 Sheets-Sheet 2
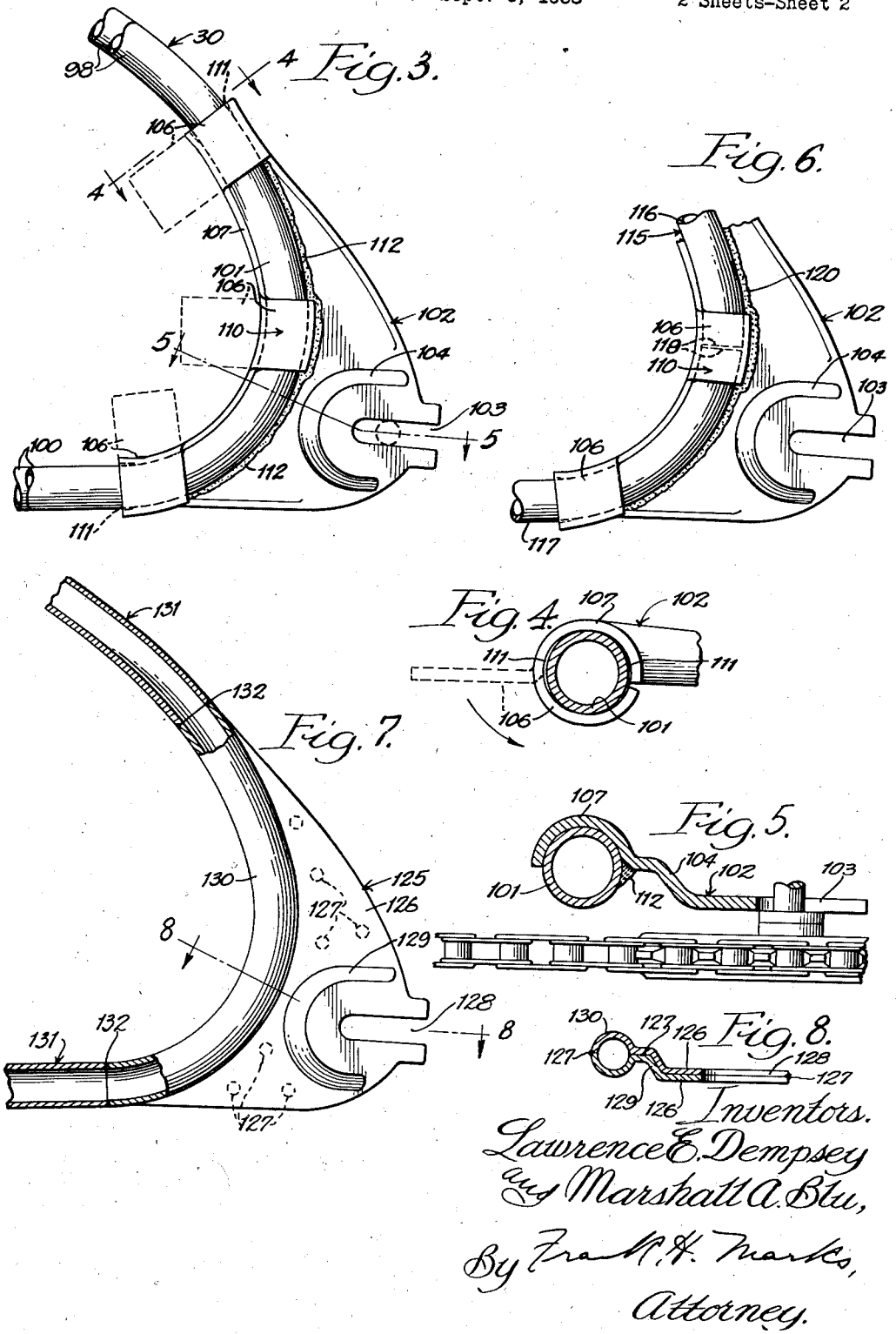

Patented Apr. 28, 1942

2,280,801

UNITED STATES PATENT OFFICE 2,280,801

BICYCLE CONSTRUCTION

Lawrence E. Dempsey, Oak Park, and Marshall A. Blu, Bellwood, Ill., assignors to Sears, Roebuck and Co., Chicago, Ill., a corporation of New York Application September 6, 1938, Serial No. 228,502

4 Claims. (Cl. 280—284)

This invention relates to frame construction for bicycles and the like.

In the ensuing description and claims, the term bicycle is used for convenience as one type of conveyance to which the invention is applicable, but that term is not to be regarded as one of limitation, since the invention is applicable to other velocipedes, motorcycles and the like, as will be apparent to any one skilled in the art.

It is an object of our invention to provide a novel spring frame for a bicycle.

It is another object to provide a bicycle in which welding and brazing burs are shielded from view, thereby eliminating the need for removing the burs.

It is another object to provide a full elliptical bicycle spring frame construction having its places of support at the ends of the major axis of the ellipse.

Another object is to provide a frame of this character in which the load is spread and excessive strain due to breathing, twisting and other causes is obviated.

It is also an object of the invention to provide an improved crank support.

An object of the invention is to provide a tubular bicycle frame structure wherein the upper, lower and rear fork reaches will comprise primarily a transversely weldless continuous tubular formation which eliminates the necessity for the inclusion of a central tube or bridge strut.

A further object is to provide a spring frame of such construction that fenders, a tank and the like may be mounted thereon in such manner that breathing of the frame is not interfered with.

Another object is to provide a novel support for a frame on the rear axle bearing.

Further objects and advantages of the invention will appear as the description proceeds.

The invention will be understood more readily upon reference to the following description and the accompanying drawings, in which:

Fig. 1 is a side elevation of a bicycle frame constructed in accordance with one form of the invention;

Fig. 2 is a plan view of the structure appearing in Fig. 1, certain parts being omitted for the sake of clarity;

Fig. 3 is a fragmentary elevation of the rear end frame construction appearing in Figs. 1 and 2 and taken as indicated by the line 3—3 in Fig. 2;

Fig. 4 is an enlarged fragmentary sectional view taken as indicated by the line 4—4 in Fig. 3;

Fig. 5 is an enlarged sectional view taken as indicated by the line 5—5 in Fig. 3;

Fig. 6 is a view similar to Fig. 3 but of another form of the invention;

Fig. 7 is a view similar to Fig. 3 but of still another form of the invention; and Fig. 8 is a sectional view taken as indicated by the line 8—8 in Fig. 7.

Referring now more particularly to Figs. 1 and 2, there is provided in accordance with one form of the invention a pair of one-piece tubular spring frame members 30 of generally elliptical form disposed in generally symmetrical relation on opposite sides of the median longitudinal plane of a bicycle, the ends 31 of each spring being disposed in sockets 32 extending rearwardly from the steering post sleeve or journal 33. The ends 31 are suitably joined to said sockets as by welding or brazing.

The journal 33 may be of sheet metal such as sheet steel and affords longitudinal seam portions which may be joined by welding, if desired, forming gusset portions 37 of considerable area and strength. The gusset may extend in a generally vertical plane dividing the sockets into right and left pairs. The sockets are joined to the gusset by gusset arms 38 of preferably arch-like form. The gusseting thus serves to brace the ends of the springs in relation to one another and the sleeve and, in conjunction with the sockets and the remainder of the sleeve, prevents excessive strain of the sleeve and breathing of the springs at the forward ends thereof, vertically, laterally and torsionally, and distributes the load over a substantial area.

Because of this gusseting and socket construction, a journal of relatively thin, light material may be employed. There is provided accordingly a journal and frame coupling which combines lightness, economy, ruggedness and rigidity.

In order that the necessity for grinding burs off may be obviated, as well as to provide an improved appearance, the sleeve 33 and the connections between it and the frame springs may be shielded by a shroud 40 in such manner, preferably, that it takes no load.

The frame comprises an upper reach portion or backbone 97, an upper rear wheel fork 98, a lower reach portion 99 and a lower rear wheel fork 100.

The rear end spring frame construction of Figs. 1 and 2 is shown in detail in Figs. 3, 4 and 5. Each spring 30 is bent so that its rearmost portion 101 forms an end of an ellipse, each spring extending integrally throughout in juxtaposition to the associated rear bearing hanger bracket 102. The bracket 102 has the usual rear axle-receiving slot 103 and is offset at 104 for strength and for locating the sprocket so that it and the chain will clear the inner side of the bend 101 of the associated frame spring (Fig. 5). The bracket 102 may have straps 106 extending from the forward margin 107 of said bracket, said margin being curved longitudinally and transversely to accommodate the rear bent end 101 of the associated spring 30.

Before the assembly of the spring and its associated bracket, if straps are used, they may be extended as shown in dotted lines (Figs. 3 and 4), so that the rear and 101 of the spring may be accommodated in the forward margin 107. Thereafter, the straps 106 may be bent as shown by the arrow in Fig. 4 so as to be wrapped about the adjacent exposed portions of said end. The free ends of the bracket may be flared, as shown at 111, to allow for bending movements or breathing of the upper and lower portions of each fork.

Welding, brazing or the like may be then employed to integrally unite the forks and bracket 102 as shown at 112.

Another form of rear hanger bracket and associated spring construction is shown in Fig. 6, wherein the frame is substantially identical with that just described except that each spring 115 is made in two sections 116 and 117 terminating with the ends 118 juxtaposed adjacent the rear part of the ellipse, and welded as at 119 or otherwise suitably united to the bracket 102 substantially anywhere along the same.

The rear axle hanger bracket construction constitutes a gusset which rigidifies the rear end of each spring and prevents excessive breathing of the upper and lower parts of each spring at such end. The gusset structure 37 at the forepart of the frame has a like function, as has been explained, so that substantially only the intermediate portions or reaches have a breathing action. Since excessive breathing may have a destructive effect on bends, it is apparent that with the construction described we have provided a spring frame which affords increased comfort to the rider and will last indefinitely.

Another form of rear end spring frame construction is shown in Figs. 7 and 8, wherein each hanger bracket 125, while of the same general outline as those above referred to, is preferably formed of complemental halves 126 welded together as at 127 to provide a rear axle-receiving slot 128 and an offset as at 129 having the same purpose as the portion 104. The bracket includes a tube 130 having a curbed form similar to the forward portion of the bracket 102 above described. The spring structure adapted to cooperate with the bracket 125 comprises upper and lower sections 131 welded to the tube 130 as shown at 132, completing an elliptical spring which to all intents and purposes is like that of Figs. 3 and 6.

A crank support embodying features of the invention comprises a housing 134 having front and rear openings 140 and 141, respectively, for the passage of the intermediate portions of the lower reaches 99 of the springs 30. Bracing apart and secured as by welding to said portions of the springs is a bracket 143 affording a cradle in which is secured a bearing sleeve or journal 145 as by welding. The bracket 143 supports a housing or hanger 153 to which a kick stand 155 may be adjustably pivoted.

The cradle bracket 143 extends throughout a substantial distance along and is securely brazed or welded to the lower reaches 99 of the springs, so that the load is distributed along the frame and the torsional and other effects resulting from pedaling are effectively withstood.

The bracket 143 may have a dependent rear portion 165 to which the lower end 166 of a rear mud guard 167 may be anchored. The guard is preferably slotted to allow for lost motion when the spring frame breathes and to insure a good fit notwithstanding dimensional differences arising in manufacture.

A form of seat or saddle support embodying the invention is shown generally at 175 (Fig. 1) and comprises upper and lower jaws 176 and 177 adapted to slidably receive the portions 178 of the upper reach 97 of the frame, suitable means (not shown) being employed to securely clamp the jaws in place. It will be noted that the associated parts 178 of said springs are parallel as seen in Fig. 2, so that the sections 176 and 177 may be slid longitudinally along said springs for a substantial distance.

A gusset 195 welded or otherwise suitably secured at the forward end of the upper rear fork 98, formed by the divergent rearwardly disposed upper portions of the springs 30, preferably has a dependent portion 196 to which the adjacent part of the rear wheel mud guard 167 is secured.

A tank 205 for tools and other equipment may be supported by the forepart of the lower reach 99 of the frame and a rear part of the upper reach 97.

A bar 218 has a portion welded or brazed to the tank. A bolt 221 extends up through the rear end 222 of the bar 218 and through a longitudinal slot 223 in the fork gusset 195 and into a nut 224 so as to anchor the bar to the frame while affording lost motion so that breathing of the spring frame will not be interfered with and the tank and bar will take no load. The slotted construction also is advantageous since the same tank unit is thereby attachable to frames of different sizes. Moreover, dimensional differences arising in manufacture will not interfere with attachment of the tank units.

It will be seen from the foregoing that we have provided a substantially full elliptical substantially unbridged reinforced spring frame construction which may include a continuous tube, with its forward vertex at the front post and its rear vertex at the rear axle, its lower reach supporting the crank substantially centrally or elsewhere between said vertices, while its upper reach supports the seat substantially centrally or elsewhere between said vertices. The construction is particularly sturdy at the vertices and at the crank support, the forward ends of the springs being rigidly joined to the steering post journal, and the rear vertices of the springs being integrally united with the rear axle brackets. The steering post journal may be covered with an aesthetic metal or other shroud which is readily and securely applied and removed and covers welded, brazed or other joints, making the cleaning of welds unnecessary and thereby expediting the manufacture of the finished article and at the same time improving its appearance. The bight of the front fork may likewise be shielded. The crank is supported in a readily assembled and securely mounted housing over the lower reach of the elliptical frame. Unusual ranges of horizontal and vertical adjustment of the seat are afforded.

Various modifications coming within the spirit of our invention may suggest themselves to those skilled in the art, and hence we do not wish to be limited to the specific form shown or uses mentioned, except to the extent indicated in the appended claims, which are to be interpreted as broadly as the state of the art will permit.

We claim:

1. Bicycle construction comprising a resilient frame member having upper and lower rear fork portions joined by a bend, and a relatively stiff rear axle hanger integrally united with said bend, said hanger having end sockets through which said forks extend, said sockets being formed to provide clearance between them and said fork portions to allow for relative flexing of said portions toward and away from each other in said sockets with respect to their positions when unstressed.

2. Bicycle or the like construction comprising a frame having a resilient upper rear fork portion, a resilient lower rear fork portion, the rear ends of said portions being vertically spaced apart, and an insert comprising a rear wheel hanger part disposed between and forming a continuation of said ends, said part comprising complemental members having longitudinal arcuate semi-cylindrical portions welded together to form an arcuate cylindrical portion and also having plate-like extensions welded together at the convex side of said cylindrical portion, the ends of said cylindrical portion being welded to said rear ends of said fork portions, said cylindrical portion being disposed rearwardly of said rear ends.

3. A rear axle gusset comprising a sheet metal blank having a recess for the reception of an axle and having opposite said recess an arcuate channel for the reception of the juncture between the upper and lower rear fork portions of the frame of a bicycle or the like, said blank having bendable flaps extending from said channel and adapted to be bent to form with said channel sleeve portions for embracing said juncture.

4. Frame construction for bicycles and the like, comprising a substantially elliptical unbridged spring frame member having its upper and lower portions forming an acute angle at the extreme rear end of the frame member, tending normally to flex at said angle, and means rigidifying acutely angularly related portions of said member adjacent said end of the ellipse so as to prevent excessive breathing of said member at said end.

LAWRENCE E. DEMPSEY.
MARSHALL A. BLU.